(12) United States Patent
Gravano et al.

(10) Patent No.: US 7,146,358 B1
(45) Date of Patent: Dec. 5, 2006

(54) SYSTEMS AND METHODS FOR USING ANCHOR TEXT AS PARALLEL CORPORA FOR CROSS-LANGUAGE INFORMATION RETRIEVAL

(75) Inventors: Luis Gravano, New York, NY (US); Monika H. Henzinger, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 664 days.

(21) Appl. No.: 09/939,661

(22) Filed: Aug. 28, 2001

(51) Int. Cl.
*G06F 17/30* (2006.01)
*G06F 7/00* (2006.01)

(52) U.S. Cl. .............................. 707/4; 707/5
(58) Field of Classification Search ............... 707/1–6, 707/8–10, 100–104.1, 206; 704/1–3, 8–10, 704/4, 277; 709/206, 225; 706/45, 47, 11
See application file for complete search history.

(56) References Cited

U.S. PATENT DOCUMENTS

| | | | | |
|---|---|---|---|---|
| 5,579,224 A | * | 11/1996 | Hirakawa et al. | 704/2 |
| 5,873,056 A | * | 2/1999 | Liddy et al. | 704/9 |
| 6,006,221 A | * | 12/1999 | Liddy et al. | 707/5 |
| 6,094,652 A | * | 7/2000 | Faisal | 707/5 |
| 6,212,537 B1 | * | 4/2001 | Nosohara | 715/536 |
| 6,263,329 B1 | * | 7/2001 | Evans | 707/3 |
| 6,321,189 B1 | * | 11/2001 | Masuichi et al. | 704/7 |
| 6,349,276 B1 | * | 2/2002 | McCarley | 704/8 |
| 6,360,196 B1 | * | 3/2002 | Poznanski et al. | 704/8 |
| 6,418,431 B1 | * | 7/2002 | Mahajan et al. | 707/4 |
| 6,490,548 B1 | * | 12/2002 | Engel | 704/10 |
| 6,604,101 B1 | * | 8/2003 | Chan et al. | 707/4 |

OTHER PUBLICATIONS

David Hull et al.:Query Across Languages "A Dictionary-Based Approach to Multilingual Information Retrieval" 1996, ACM, pp. 49-57.*
Nancy Ide et al.: Introduction to the Special Issue on Word Sense Disambiguation "The State of the Art", 1998, Aoociation for Computational Linguistics ACM, pp. 1-40.*
Hirohito Inagaki et al.:"Sentence disambiguation by document oriented preference sets", 1990, ACM, vol. 2, pp. 1-5.*

(Continued)

*Primary Examiner*—Greta Robinson
*Assistant Examiner*—Jacques Veillard
(74) *Attorney, Agent, or Firm*—Harrity Snyder, LLP

(57) ABSTRACT

A system performs cross-language query translations. The system receives a search query that includes terms in a first language and determines possible translations of the terms of the search query into a second language. The system also locates documents for use as parallel corpora to aid in the translation by: (1) locating documents in the first language that contain references that match the terms of the search query and identify documents in the second language; (2) locating documents in the first language that contain references that match the terms of the query and refer to other documents in the first language and identify documents in the second language that contain references to the other documents; or (3) locating documents in the first language that match the terms of the query and identify documents in the second language that contain references to the documents in the first language. The system may use the second language documents as parallel corpora to disambiguate among the possible translations of the terms of the search query and identify one of the possible translations as a likely translation of the search query into the second language.

29 Claims, 8 Drawing Sheets

OTHER PUBLICATIONS

L. Ballesteros, W.B. Corft, "Resolving Ambiguity for Cross-Language Retrieval," Proceedings of ACM SIGIR, pp. 64-71, 1998.

Ruiz, Miguel et al., "CINDOR Conceptual Interlingua Document Retrieval: TREC-8 Evaluation," 10 pages, 1998.

T. Davis and T. Dunning, "Query Translation Using Evolutionary Programming for Multi-lingual Information Retrieval," In Proceedings of the Fourth Annual Conference on Evolutionary Programming, 11 pages, 1995.

Tiedemann, Jörg, "Extraction of Translation Equivalents from Parallel Corpora," In Proceedings of the 11th Nordic Conference on Computational Linguistics NODALI98, Center for Sprogteknologi and Department of General and Applied Linguistics, University of Copenhagen, pp. 1-7, 1998.

Kang, Insu et al., "Cross-Language Text Retrieval by Query Translation Using Term Reweighting," International Journal of Pattern Recognition and Artificial Intelligence, vol. 14, No. 5, pp. 617-629, 2000.

Yang, Yiming et al., "Translingual Information Retrieval: Learning from Bilingual Corpora," Al Journal special issue: Best of IJCAI-97, pp. 1-20, 1998.

Gregory Grefenstette, "The World Wide Web as a Resource for Example-Based Machine Translation Tasks", Proceedings of ASLIB Conference on Translating and the Computer, 1998; 12 pages.

* cited by examiner

SYSTEMS AND METHODS FOR USING ANCHOR TEXT AS PARALLEL CORPORA FOR CROSS-LANGUAGE INFORMATION RETRIEVAL

BACKGROUND OF THE INVENTION

1. Field of the Invention

The present invention relates generally to information retrieval systems and, more particularly, to systems and methods for translating search queries for cross-language information retrieval.

2. Description of Related Art

Many users of a hypertext medium, such as the World Wide Web ("web"), can read documents in more than one language. Consider, for example, a query in English from a user that can read English and Spanish. A conventional technique for identifying documents in Spanish for this English query involves translating the query to Spanish and then processing the translated query to identify matching Spanish documents.

Query terms are inherently ambiguous. Therefore, translating them is challenging. Some conventional approaches use a bilingual dictionary to perform query translations. It has been found, however, that using a bilingual dictionary results in noisy translations. The noisy translations may be due to many factors. For example, a translation may result in extraneous terms being added to the query because a dictionary entry may list several senses for a term. In other words, each term may have one or more possible translations in the dictionary. Also, general dictionaries often do not include technical terminology. This makes translation of technical query terms difficult.

Other conventional approaches rely either on "parallel corpora" (i.e., collections of documents in which each of the documents appears in two different languages) or "co-occurrence statistics" of terms in documents in the target language to which the query is being translated to translate query terms. A problem with the parallel corpora approach is that such corpora are rare and building them is prohibitively expensive.

As a result, there exists a need for mechanisms that translate queries to facilitate cross-language information retrieval.

SUMMARY OF THE INVENTION

Systems and methods consistent with the present invention address this and other needs by providing mechanisms for translating search queries that exploit anchor text in one language that refer to documents in another language to produce good quality, less noisy query translations.

In accordance with the principles of the invention as embodied and broadly described herein, a system performs cross-language query translations. The system receives a search query that includes terms in a first language and determines possible translations of the terms of the search query into a second language. The system also locates documents in the first language that contain references that match the terms of the search query and identify documents in the second language. The system then disambiguates among the possible translations of the terms of the search query using the identified documents to identify one of the possible translations as a likely translation of the search query into the second language.

In another implementation consistent with the present invention, a method for performing cross-language document retrieval is provided. The method includes receiving a search query that includes one or more terms in a first language; performing a search of documents in the first language to locate one or more of the first language documents that contain anchor text that matches the search query and identifies one or more documents in a second language; determining possible translations of the terms of the search query into the second language; using the identified second language documents as parallel corpora for disambiguation among the possible translations of the terms of the search query; identifying one of the possible translations as a correct translation of the search query based on the disambiguation; and performing a search of second language documents using the correct translation of the search query.

In yet another implementation consistent with the present invention, a system for performing cross-language query translations is provided. The system receives a search query that includes terms in a first language and determines possible translations of the terms of the search query into a second language. The system also locates documents in the first language that contain references that match the terms of the search query and refer to other documents in the first language and identify documents in the second language that contain references to the other documents. The system then disambiguates among the possible translations of the terms of the search query using the identified documents to identify one of the possible translations as a likely translation of the search query.

In a further implementation consistent with the present invention, a method for performing cross-language query translation is provided. The method includes receiving a search query that includes terms in a first language; determining possible translations of the terms of the search query into a second language; locating documents in the first language that match the terms of the search query; identifying documents in the second language that contain references to the first language documents; and disambiguating among the possible translations of the terms of the search query using the second language documents to identify one of the possible translations as a likely translation of the search query.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention translate search queries to facilitate information retrieval in different languages. The systems and methods use anchors in one language that link to documents in another language to produce good quality, less noisy translations.

EXEMPLARY NETWORK CONFIGURATION

Figure 1:
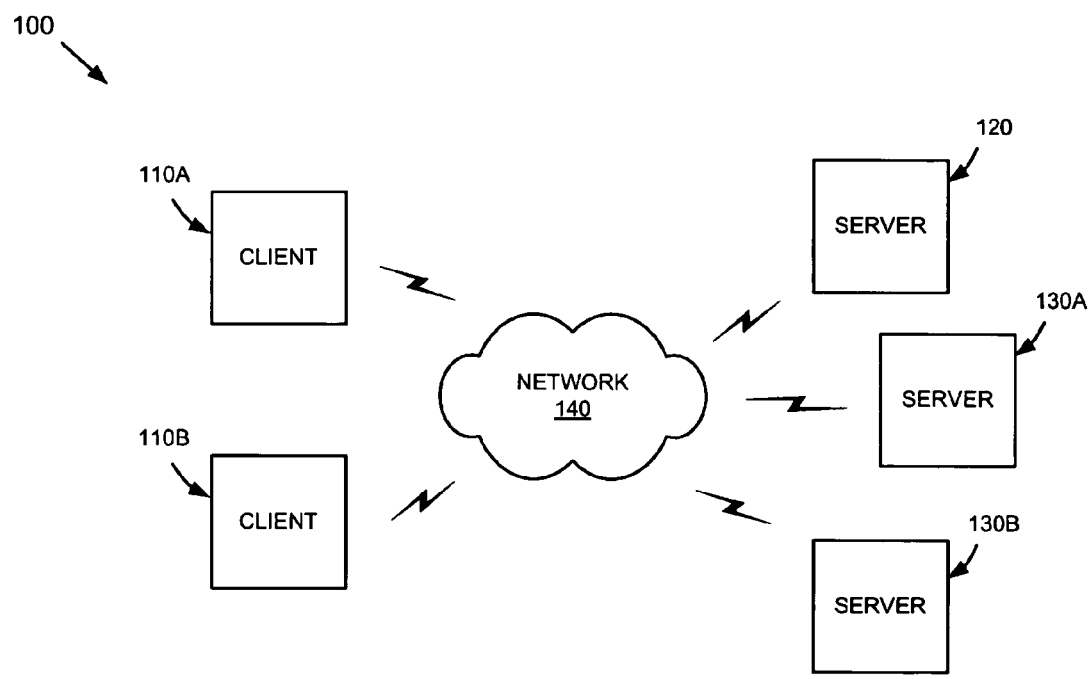
FIG. 1 is a diagram of an exemplary network in which systems and methods consistent with the present invention may be implemented.

FIG. 1 is an exemplary diagram of a network 100 in which systems and methods consistent with the present invention may be implemented. The network 100 may include multiple clients 110A, 110B connected to multiple servers 120–130A, 130B via a network 140. The network 140 may include a local area network (LAN), a wide area network (WAN), a telephone network, such as the Public Switched Telephone Network (PSTN), an intranet, the Internet, a similar or dissimilar network, or a combination of networks. Two clients 110A, 110B and three servers 120–130A, 130B have been illustrated as connected to network 140 in FIG. 1 for simplicity. In practice, there may be more or fewer clients and servers. Also, in some instances, a client may perform the functions of a server and a server may perform the functions of a client.

The clients 130A, 130B may include devices, such as wireless telephones, personal computers, personal digital assistants (PDAs), laptops, or other types of communication devices, threads or processes running on these devices, and/or objects executable by these devices. The servers 120–130A, 130B may include server devices, threads, and/or objects that operate upon, search, or maintain documents in a manner consistent with the present invention. The clients 130A, 130B and servers 120–130A, 130B may connect to the network 140 via wired, wireless, or optical connections.

In an implementation consistent with the present invention, the server 120 may include a search engine usable by the clients 110A, 110B. The servers 130A, 130B may store documents, such as web documents or web pages, accessible by the clients 110A, 110B and the server 120.

EXEMPLARY SERVER ARCHITECTURE

Figure 2:
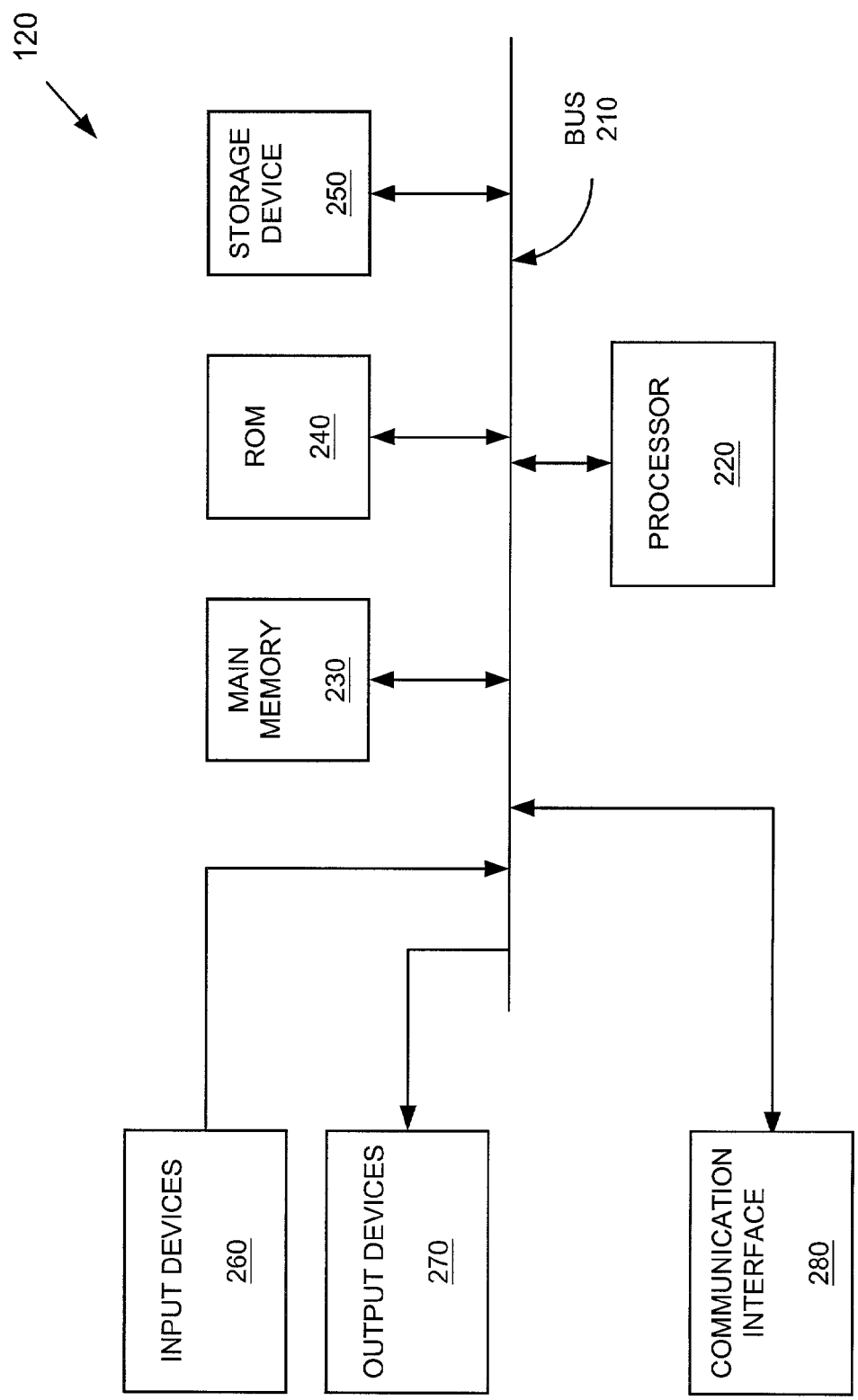
FIG. 2 is an exemplary diagram of a server of FIG. 1 in an implementation consistent with the present invention.

FIG. 2 is an exemplary diagram of the server 120 in an implementation consistent with the present invention. The server 120 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the server 120.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit an operator to input information to the server 120, such as a keyboard, a mouse, a pen, voice recognition and/or biometric mechanisms, etc. The output devices 270 may include one or more conventional mechanisms that output information to the operator, including a display, a printer, a speaker, etc. The communication interface 280 may include any transceiver-like mechanism that enables the server 120 to communicate with other devices and/or systems. For example, the communication interface 280 may include mechanisms for communicating with another device or system via a network, such as network 140.

As will be described in detail below, the server 120, consistent with the present invention, perform certain searching-related operations. The server 120 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

QUERY TRANSLATION MECHANISMS

Figure 3:
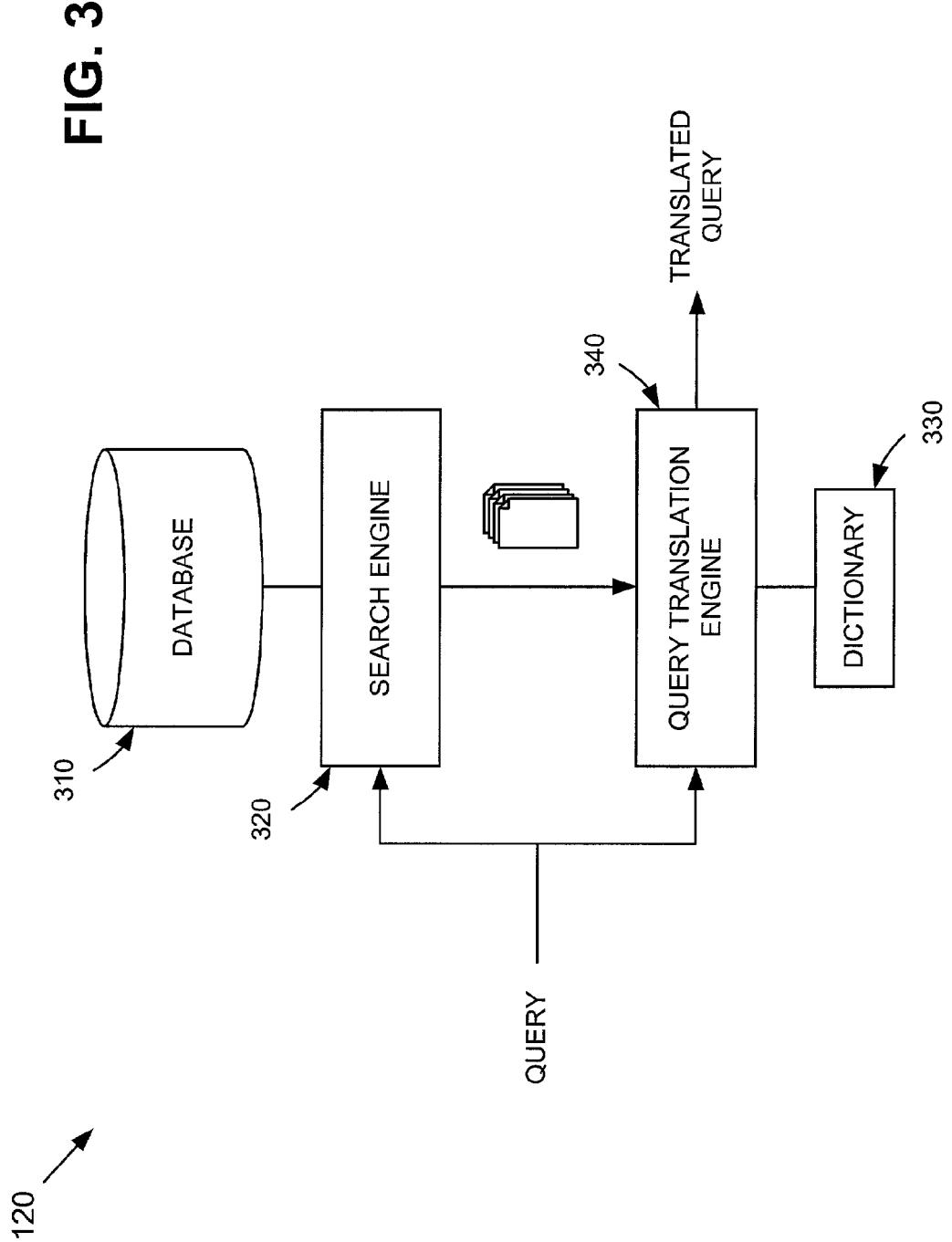
FIG. 3 is an exemplary functional diagram of a query translation portion of the server of FIG. 2 according to an implementation consistent with the present invention.

FIG. 3 is an exemplary functional diagram of a portion of the server 120 according to an implementation consistent with the present invention. This portion of the server 120 may be implemented in software, hardware, or a combination of software and hardware.

The portion of the server 120 shown in FIG. 3 includes a database 310, a search engine 320, a dictionary 330, and a query translation engine 340. The database 310 may store copies of web documents stored by other servers 130 in the network 140 and/or a tree or directed graph of linked web documents. The documents and directed graph may be stored in the database 310 by a spider program that "crawls" web documents on network 140 based on their hyperlinks. As a result, the spider program may generate a tree or directed graph of linked web documents. The crawled documents may be stored in the database as an inverted index in which each term in the database 310 is associated with all the crawled documents that contain that term.

Figure 4:
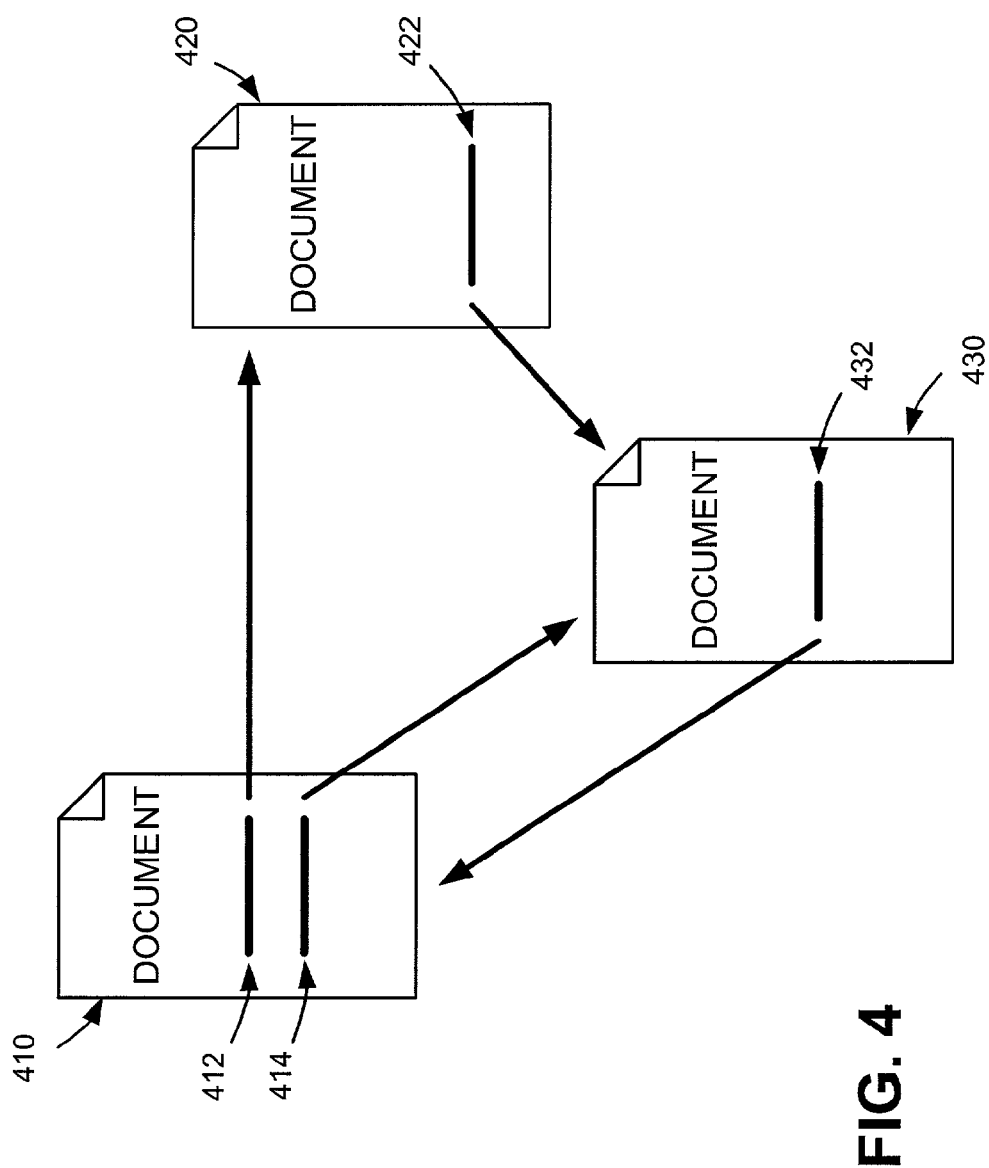
FIG. 4 is a diagram illustrating relations between an exemplary set of web documents that may be stored in the database of FIG. 3.

FIG. 4 is a diagram illustrating relations between an exemplary set of web documents that may be stored in the database 310. Documents 410–430 contain links to each other. In the nomenclature of the popular Hyper-Text Markup Language (HTML) standard, hyperlinks to other documents are specified using an HTML structure called an anchor. An anchor specifies the Uniform Resource Locator (URL) of the document being linked. Typically, browsers display anchors as text distinct from the main text using, for example, underlining or different colors. A user, by selecting the anchor, causes the browser to retrieve the web document specified by the URL.

In FIG. 4, documents 410–430 contain various links. In particular, document 410 contains an anchor 412 that corresponds to a forward link to document 420 and an anchor 414 that corresponds to a forward link to document 430. Document 420 contains an anchor 422 that corresponds to a forward link to document 430. Document 430 contains an anchor 432 that corresponds to a forward link to document 410.

Returning to FIG. 3, the search engine 320 may include logic that identifies one or more documents or a list of documents in response to a search query that includes one or more search terms. For example, the search engine 320 may receive a search query from a user and respond by returning relevant information or a list of relevant information to the user. Typically, users may ask the server 120 to locate web documents relating to a particular topic that are stored at other devices or systems connected to network 140 or another network. The search engine 320 may access the database 310 to compare the terms in the search query to the documents in the database 310.

The dictionary 330 may include one or more bilingual machine-readable dictionaries. The dictionary 330 may provide information to facilitate translations between multiple languages. The information in the dictionary 330 may be used by the query translation engine 340 to translate terms in a search query.

The query translation engine 340 may include logic that translates the terms of a search query using information from the dictionary 330 and the search engine 320. For example, the query translation engine 340 may identify potential translations for the terms of a search query based on the information in the dictionary 330. The query translation engine 340 may then disambiguate among the potential translations based on text from documents identified by the search engine 320, as described below.

EXEMPLARY PROCESSING FOR QUERY TRANSLATION

Figure 5:
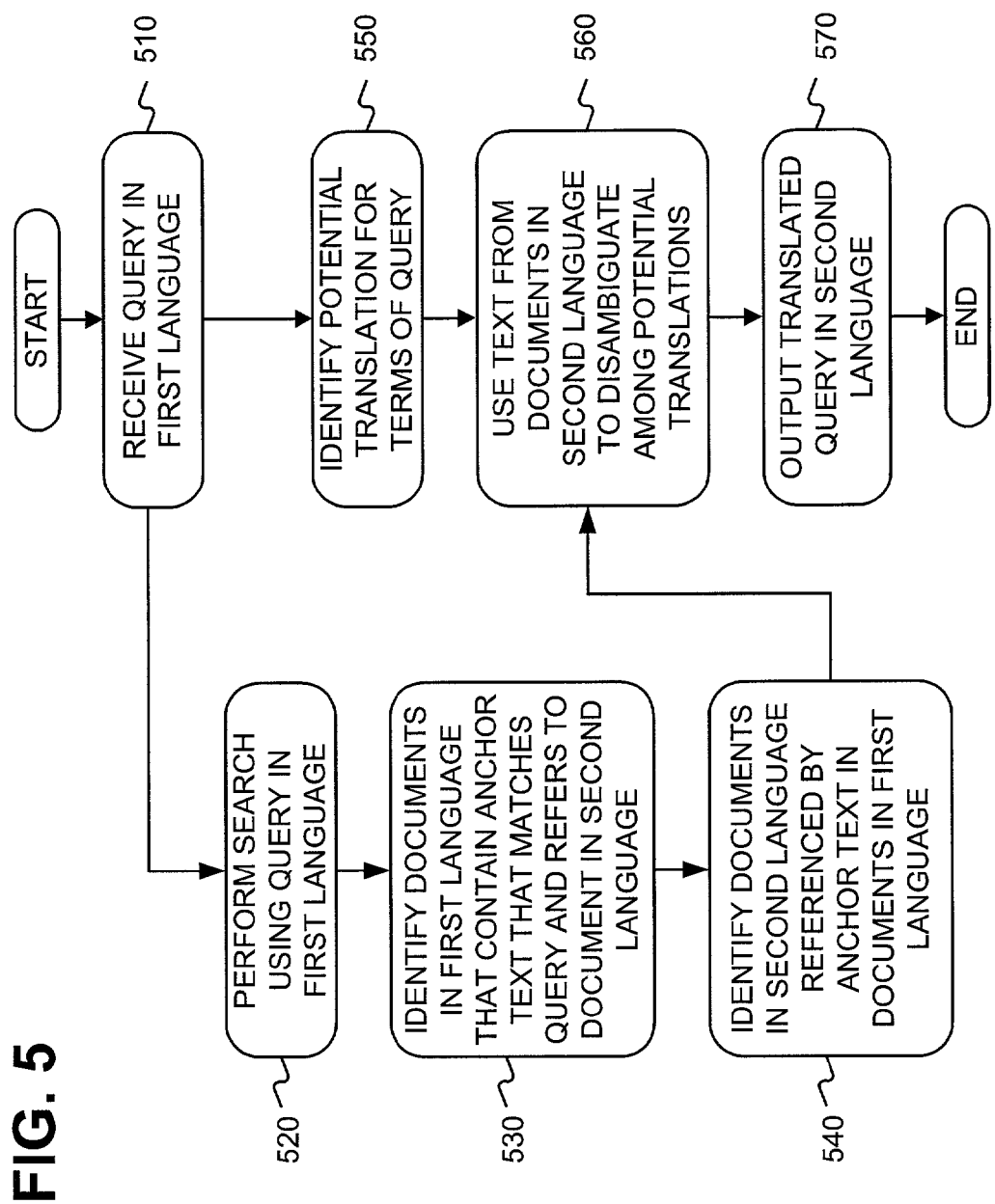
FIG. 5 is a flowchart of exemplary processing for translating a search query in accordance with an implementation consistent with the present invention.

FIG. 5 is a flowchart of exemplary processing for performing query translation in accordance with an implementation consistent with the present invention. Processing may begin with a user accessing a server, such as server 120 (FIG. 1), using, for example, web browser software on a client, such as client 110. The user may then provide a query that includes one or more search terms to the search engine 320 (FIG. 3) maintained by the server 120 (act 510).

Figure 6:
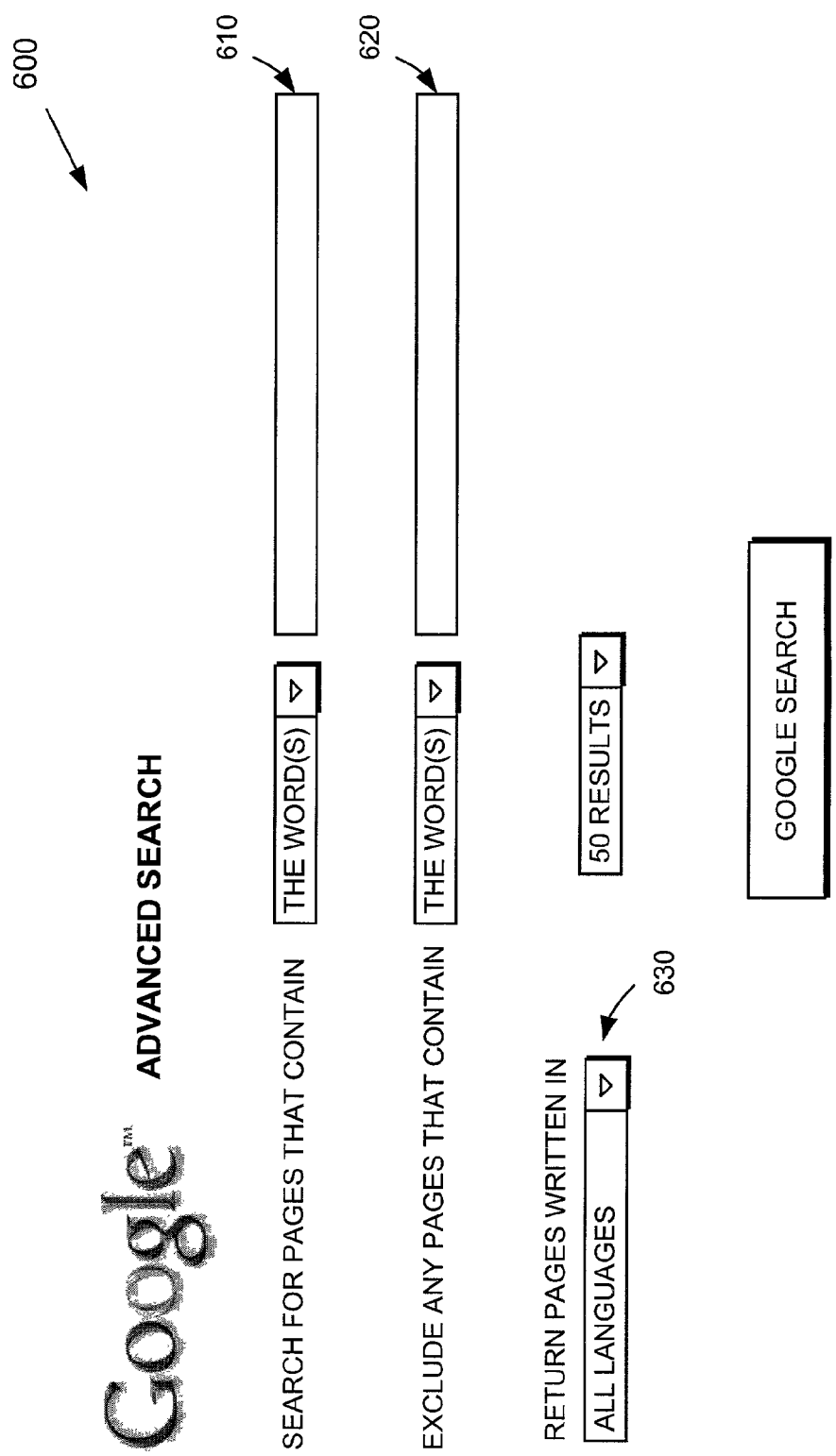
FIG. 6 is a diagram of an exemplary graphical user interface that may be presented to the user to facilitate the providing of search information.

Assume, for purposes of this example, that the user provides search terms in a first language and desires documents in a second language. To facilitate the providing of information for a search, the server 120 may provide a graphical user interface (GUI) to the user. FIG. 6 is an exemplary diagram of a GUI 600 consistent with the present invention. The GUI 600 may prompt the user to enter one or more search terms/words to include (box 610) or exclude (box 620) in the search results. The GUI 600 may also prompt the user to identify the language(s) in which the results will be presented (box 630).

Returning to FIG. 5, the search engine 320 may perform a search using the terms of the query in the first language (act 520). In this case, the search engine 320 looks for documents in the first language that contain anchor text that matches the search query and refers to a document in the second language (act 530). When determining whether there is a match between the terms of the search query and the anchor text, the search engine 320 may consider not only the text making up the anchor, but also surrounding text, such as the text in the paragraph containing the anchor. The search engine 320 may then identify the documents in the second language that are referenced by the anchor text in the first documents (act 540) and provides these documents to the query translation engine 340.

Meanwhile, the query translation engine 340 may perform an initial translation on the terms of the search query. For example, the query translation engine 340 may use the dictionary 330 to identify potential translations for terms in the query (act 550). A dictionary entry may have several senses for a term, however, leading to several possible translations.

To disambiguate among the potential translations, the query translation engine 340 may use conventional parallel corpora disambiguation techniques, such as the techniques identified in Y. Yang et al., "Translingual Information Retrieval: Learning from Bilingual Corpora," Artificial Intelligence Journal special issue: Best of IJCAI-97, 1998, pp. 323–345, and L. Ballesteros et al., "Resolving Ambiguity for Cross-Language Retrieval," Proceedings of ACM SIGIR, 1998, pp. 64–71, which are incorporated herein by reference. According to an implementation consistent with the present invention, however, the query translation engine 340 uses the text from the documents in the second language that were identified by the search engine 320 as the parallel corpora (act 560). Because these documents possibly contain text related to the original search query, the translations produced by the query translation engine 340 are of good quality and less noisy.

The query translation engine 340 may then output the translated query (in the second language) (act 570). The search engine 320, or another search engine, may identify documents in the second language that correspond to the translated query and present the documents to the user.

EXAMPLE

Assume that a user provides a search query to the server 120 in Spanish, but desires documents to be returned in English. Further, assume that the user desires documents relating to "banks interest." In this case, the query provided by the user may include the terms "bancos" and "interés." To facilitate English-language document retrieval, the server 120 may translate the Spanish query to English.

The query translation engine 340 may perform an initial translation of the terms of the query using, for example, the dictionary 330. In this case, the query translation engine 340 finds that each of the terms of the query has more than one possible translation. For example, the Spanish word "bancos" could be translated as "banks" or "benches" (among other possibilities) in English. The Spanish word "interés" could be translated as "interest" or "concern" (among other possibilities) in English. The query translation engine 340 disambiguates among the possible translations using documents identified by the search engine 320.

The search engine 320 performs a search using the original Spanish query (i.e., "bancos interés") to identify Spanish-language documents that include anchors that contain all of the query terms and point to English-language documents. The search engine 320 provides the English-language documents that are pointed to by the anchors to the query translation engine 340.

The query translation engine 340 analyzes the text of the English-language documents to, for example, compute the frequency of co-occurrence of the various translation possibilities. Specifically, the query translation engine 340 determines how often the word "banks" occurs with "interest," "banks" occurs with "concern," "benches" occurs with "interest," and "benches" occurs with "concern." Presumably, the query translation engine 340 would determine that "banks" and "interest" are the most frequent combination and use these terms as the correct translation for the Spanish query "bancos interés."

ALTERNATE IMPLEMENTATIONS

Figure 7:
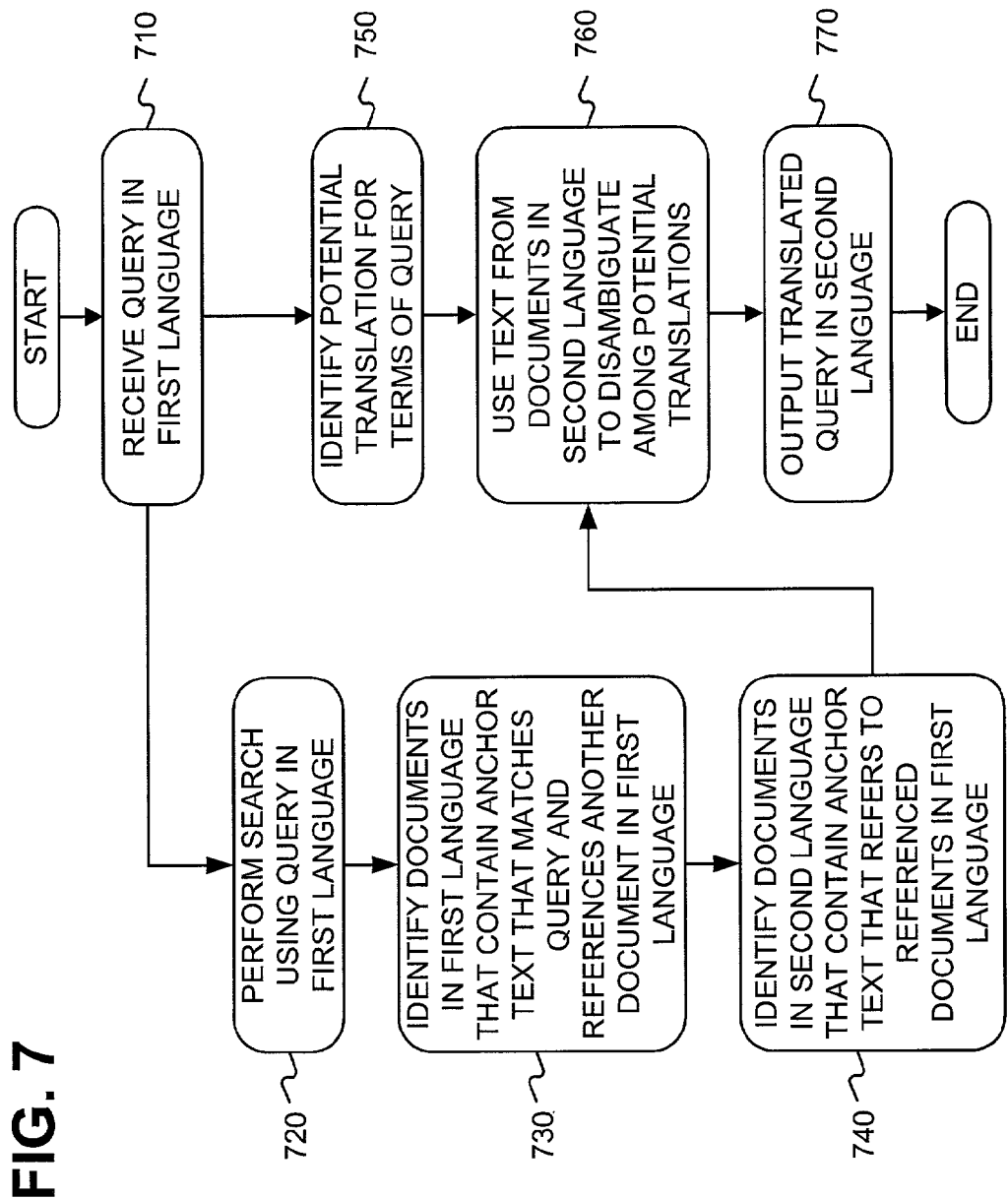
FIG. 7 is a flowchart of exemplary processing for performing query translation in accordance with an alternate implementation consistent with the present invention.

FIG. 7 is a flowchart of exemplary processing for performing query translation in accordance with an alternate implementation consistent with the present invention. Processing may begin with a user accessing a server, such as server 120 (FIG. 1), using, for example, web browser software on a client, such as client 110. The user may then provide a query that includes one or more search terms to the search engine 320 (FIG. 3) maintained by the server 120 (act 710).

Assume, for purposes of this example, that the user provides search terms in a first language and desires documents in a second language. To facilitate the providing of information for a search, the server 120 may provide a GUI to the user, such as the one illustrated in FIG. 6.

The search engine 320 may perform a search using the terms of the query in the first language (act 720). In this case, the search engine 320 looks for documents in the first language that contain anchor text that matches the search query and references another document in the first language (act 730). When determining whether there is a match between the terms of the search query and the anchor text, the search engine 320 may consider not only the text making up the anchor, but also surrounding text, such as the text in the paragraph containing the anchor.

The search engine 320 may then identify documents in the second language that contain anchor text that refers to the referenced documents in the first language (act 740). The search engine 320 may provide these documents to the query translation engine 340.

Meanwhile, the query translation engine 340 may perform an initial translation on the terms of the search query. For example, the query translation engine 340 may use the dictionary 330 to identify potential translations for terms in the query (act 750). A dictionary entry may have several senses for a term, however, leading to several possible translations.

To disambiguate among the potential translations, the query translation engine 340 may use conventional parallel corpora disambiguation techniques, such as the ones described above. According to an implementation consistent with the present invention, however, the query translation engine 340 uses the text from the documents in the second language that were identified by the search engine 320 as the parallel corpora (act 760). The text used by the query translation engine 340 may include the anchor, text surrounding the anchor, or the entire text of the documents. Because these documents possibly contain text related to the original search query, the translations produced by the query translation engine 340 are of good quality and less noisy.

The query translation engine 340 may then output the translated query (in the second language) (act 770). The search engine 320, or another search engine, may identify documents in the second language that correspond to the translated query and present the documents to the user.

Figure 8:
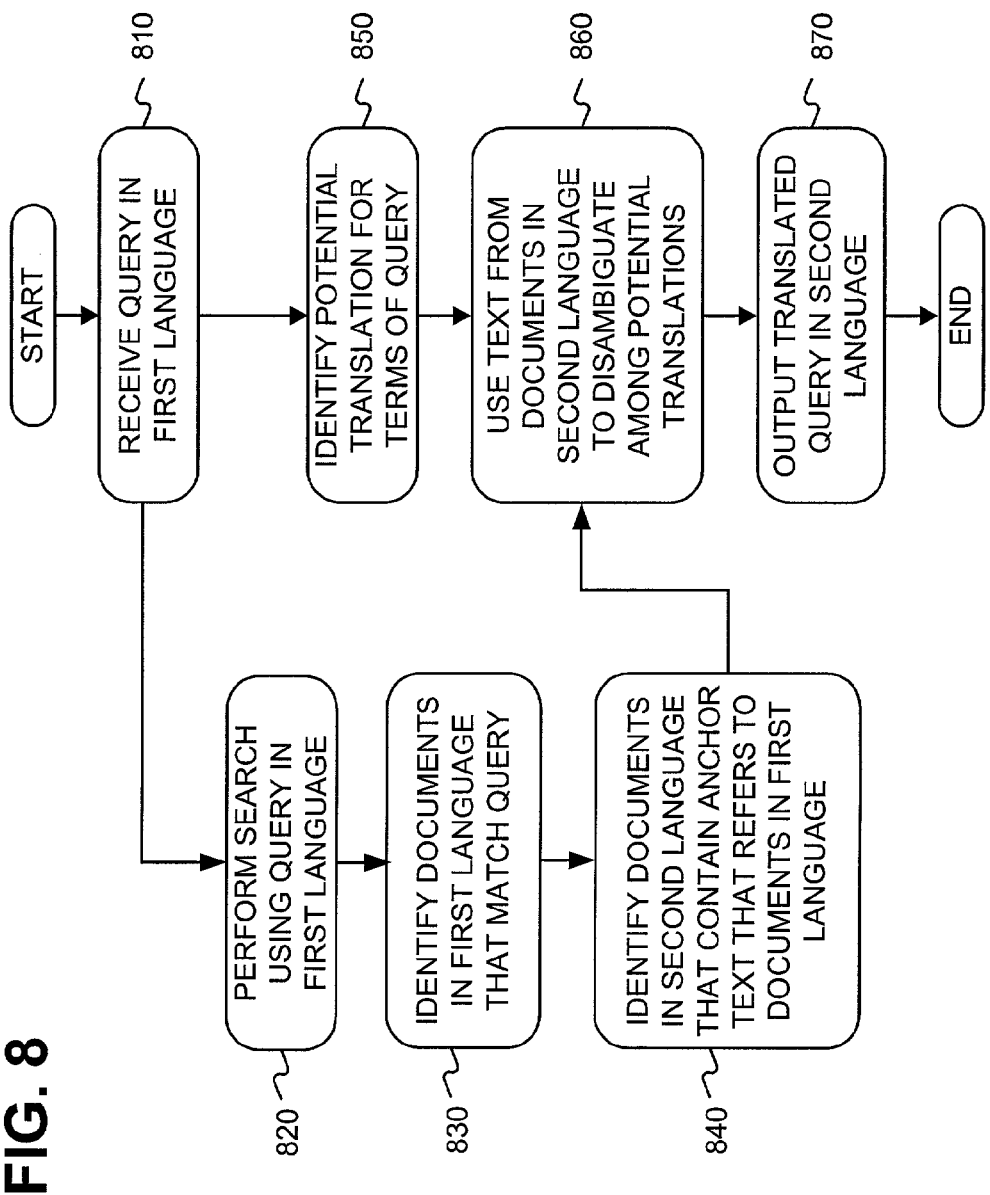
FIG. 8 is a flowchart of exemplary processing for performing query translation in accordance with another implementation consistent with the present invention.

FIG. 8 is a flowchart of exemplary processing for performing query translation in accordance with another implementation consistent with the present invention. Processing may begin with a user accessing a server, such as server 120 (FIG. 1), using, for example, web browser software on a client, such as client 110. The user may then provide a query that includes one or more search terms to the search engine 320 (FIG. 3) maintained by the server 120 (act 810).

Assume, for purposes of this example, that the user provides search terms in a first language and desires documents in a second language. To facilitate the providing of information for a search, the server 120 may provide a GUI to the user, such as the one illustrated in FIG. 6.

The search engine 320 may perform a search using the terms of the query in the first language (act 820). In this case, the search engine 320 looks for documents in the first language that contain text that matches the search query (act 830). For this implementation, the search engine 320 may match the terms of the query to any text in the documents. The search engine 320 may then identify documents in the second language that contain anchor text that refers to the documents in the first language (act 840). The search engine 320 may provide these documents to the query translation engine 340.

Meanwhile, the query translation engine 340 may perform an initial translation on the terms of the search query. For example, the query translation engine 340 may use the dictionary 330 to identify potential translations for terms in the query (act 850). A dictionary entry may have several senses for a term, however, leading to several possible translations.

To disambiguate among the potential translations, the query translation engine 340 may use conventional parallel corpora disambiguation techniques, such as the ones described above. According to an implementation consistent with the present invention, however, the query translation engine 340 uses the text from the documents in the second language that were identified by the search engine 320 as the parallel corpora (act 860). The text used by the query translation engine 340 may include the anchor, text surrounding the anchor, or the entire text of the documents. Because these documents possibly contain text related to the original search query, the translations produced by the query translation engine 340 are of good quality and less noisy.

The query translation engine 340 may then output the translated query (in the second language) (act 870). The search engine 320, or another search engine, may identify documents in the second language that correspond to the translated query and present the documents to the user.

CONCLUSION

Systems and methods consistent with the present invention provide good quality, less noisy search query translations by exploiting anchors in one language that point to documents in another language.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 5, the order of the acts may be modified in other implementations consistent with the present invention. Moreover, non-dependent acts may be performed in parallel.

Also, it has been described that the database 310, the search engine 320, and the query translation engine 340 are located on the same server 120. In other implementations consistent with the present invention, the database 310, the search engine 320, and/or the query translation engine 340 are located on different systems or devices.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. An automated method for performing cross-language query translation, comprising:
    receiving a search query that includes terms in a first language;
    determining possible translations of the terms of the search query into a second language;
    locating documents in the first language that contain links having associated content that matches the terms of the search query, the links referring to documents in the second language; and
    disambiguating among the possible translations of the terms of the search query using the documents in the second language to identify one of the possible translations as a likely translation of the search query.

2. The method of claim 1, wherein the receiving a search query includes:
    presenting a graphical user interface to a user, and
    receiving the terms of the search query in the first language from the user via the graphical user interface.

3. The method of claim 1, wherein the determining possible translations includes:
    using a dictionary to identify the possible translations of the terms into the second language.

4. The method of claim 3, wherein the dictionary includes one or more bilingual machine-readable dictionaries.

5. The method of claim 1, wherein the locating documents in the first language includes:
    performing a search of a database of documents using the search query, and
    identifying one or more of the documents in the database, each of the one or more documents containing at least one link having associated content that matches the search query, the at least one link referring to a document in the second language.

6. The method of claim 1, wherein the associated content includes anchor text.

7. The method of claim 6, wherein the associated content includes text of an anchor and text surrounding the anchor.

8. The method of claim 1, wherein the disambiguating among the possible translations includes:
    using text of the documents in the second language as parallel corpora, and
    using a parallel corpora disambiguation technique to differentiate among the possible translations of the terms of the search query.

9. The method of claim 1, wherein the disambiguating among the possible translations includes:
    determining a frequency of co-occurrence of the possible translations in the documents in the second language, and
    designating one of the possible translations with a highest frequency of co-occurrence as a correct translation.

10. The method of claim 1, wherein the documents comprise web documents or web pages.

11. The method of claim 1, wherein the links specify the uniform resource locator (URL) of the documents being linked.

12. The method of claim 1, wherein the links comprise hypertext links.

13. The method of claim 1, wherein the links include anchor text and wherein the associated content includes text surrounding the anchor text.

14. A system for performing cross-language query translation, comprising:
    means for obtaining a search query that includes terms in a first language;
    means for performing an initial translation of the terms of the search query into a second language, the initial translation identifying one or more possible translations of the terms of the search query;
    means for searching a database to locate documents in the first language that contain links having associated content that matches the terms of the search query, the links referring to documents in the second language; and
    means for disambiguating among the possible translations of the terms of the search query using the documents in the second language to identify one of the possible translations as a correct translation of the search query into the second language.

15. A system for translating search queries, comprising:
    a database of documents in a plurality of languages;
    a search engine configured to:
        receive a search query that includes terms in a first language, and
        search the database to locate documents in the first language that contain links having associated content that matches the terms of the search query, the links referring to documents in a second language; and
    a query translation engine configured to:
        receive the search query,
        determine possible translations of the terms of the search query into the second language, and
        disambiguate among the possible translations of the terms of the search query using the documents in the second language to identify one of the possible translations as a likely translation of the search query.

16. The system of claim 15, wherein the database includes a plurality of documents distributed over a network.

17. The system of claim 16, wherein the network is the Internet.

18. A computer-readable medium that stores instructions executable by one or more processing devices to perform a method for translating a search query, comprising:
    instructions for obtaining a search query that includes terms in a first language;
    instructions for determining possible translations of the terms of the search query into a second language;
    instructions for finding documents in the first language that contain links having associated content that matches the terms of the search query, the links referring to documents in the second language; and instructions for disambiguating among the possible translations of the terms of the search query using the identified documents to translate the search query into the second language.

19. A system for translating search queries, comprising:
a search engine configured to:
   receive a search query that includes one or more terms in a first language, and
   locate documents in the first language that contain links having anchor text that matches the terms of the search query, the anchor text referring to documents in a second language; and
a query translation engine configured to:
   receive the search query,
   initially translate the search query to determine possible translations of the terms of the search query into the second language, and
   disambiguate among the possible translations of the terms of the search query using the documents in the second language to identify one of the possible translations as a correct translation of the search query.

20. The method of claim 19, wherein the anchor text includes text of an anchor and text surrounding the anchor.

21. The method of claim 20, wherein the text surrounding the anchor include text of a paragraph containing the anchor.

22. A method for performing cross-language document retrieval, comprising:
   receiving a search query that includes one or more terms in a first language;
   performing a search of documents in the first language to locate one or more of the first language documents that contain links having anchor text that matches the search query, the anchor text referring to one or more documents in a second language;
   determining possible translations of the terms of the search query into the second language;
   using the second language documents as parallel corpora for disambiguation among the possible translations of the terms of the search query;
   identifying one of the possible translations as a correct translation of the search query based on the disambiguation; and
   performing a search of second language documents using the correct translation of the search query.

23. A system for performing cross-language document retrieval, comprising:
a search engine configured to:
   receive a search query that includes one or more terms in a first language,
   perform a search of documents in the first language to locate one or more of the first language documents that contain links having anchor text that matches the search query, the anchor text referring to one or more documents in a second language;
a query translation engine configured to:
   determine possible translations of the terms of the search query into the second language,
   use the second language documents as parallel corpora for disambiguation among the possible translations of the terms of the search query,
   identify one of the possible translations as a correct translation of the search query based on the disambiguation, and
   provide the correct translation of the search query to the search engine to permit the search engine to perform a search of second language documents based on the correct translation of the search query.

24. An automated method for performing cross-language query translation, comprising:
   receiving a search query that includes terms in a first language;
   determining possible translations of the terms of the search query into a second language;
   locating documents in the first language that contain links having associated content that matches the terms of the search query, the links referring to other documents in the first language;
   identifying documents in the second language that contain links that refer to the other documents; and
   disambiguating among the possible translations of the terms of the search query using the identified documents to identify one of the possible translations as a likely translation of the search query.

25. A system for performing cross-language query translation, comprising:
a search engine configured to:
   receive a search query that includes terms in a first language,
   locate documents in the first language that contain links having associated content that matches the terms of the search query, the links referring to other documents in the first language, and
   identify documents in a second language that contain links that refer to the other documents; and
a query translation engine configured to:
   determine possible translations of the terms of the search query into the second language, and
   disambiguate among the possible translations of the terms of the search query using the identified documents to identify one of the possible translations as a likely translation of the search query.

26. A method for performing cross-language document retrieval, comprising:
   receiving a search query that includes one or more terms in a first language;
   performing a search of documents in the first language to locate one or more of the first language documents that contain links that include anchor text that matches the search query, the anchor text referring to one or more other documents in the first language;
   identifying documents in a second language that contain links that refer to the one or more other first language documents;
   determining possible translations of the terms of the search query into the second language;
   using the identified second language documents as parallel corpora for disambiguation among the possible translations of the terms of the search query;
   identifying one of the possible translations as a correct translation of the search query based on the disambiguation; and
   performing a search of second language documents using the correct translation of the search query.

27. An automated method for performing cross-language query translation, comprising:
   receiving a search query that includes terms in a first language;
   determining possible translations of the terms of the search query into a second language;
   locating documents in the first language that match the terms of the search query;

identifying documents in the second language that contain links that refer to the first language documents; and disambiguating among the possible translations of the terms of the search query using the second language documents.

28. A system for performing cross-language query translation, comprising:

a search engine configured to:
receive a search query that includes terms in a first language,
locate documents in the first language that match the terms of the search query, and
identify documents in a second language that contain links that refer to the first language documents; and a query translation engine configured to:
determine possible translations of the terms of the search query into the second language, and
disambiguate among the possible translations of the terms of the search query using the second language documents to identify one of the possible translations as a likely translation of the search query.

29. A method for performing cross-language document retrieval, comprising:

receiving a search query that includes one or more terms in a first language;

performing a search of documents in the first language to locate one or more of the first language documents that match the search query;

identifying documents in a second language that contain links that refer to the one or more first language documents;

determining possible translations of the terms of the search query into the second language;

using the identified second language documents as parallel corpora for disambiguation among the possible translations of the terms of the search query;

identifying one of the possible translations as a correct translation of the search query based on the disambiguation; and performing a search of second language documents using the correct translation of the search query.

* * * * *